United States Patent [19]

Morimoto et al.

[11] Patent Number: 5,613,045

[45] Date of Patent: Mar. 18, 1997

[54] DOCUMENT EDITING DEVICE AND METHOD

[75] Inventors: Yoshinari Morimoto; Yuri Usami, both of Nagoya, Japan

[73] Assignee: Brother Kogyo Kabushiki Kaisha, Nagoya, Japan

[21] Appl. No.: 391,178

[22] Filed: Feb. 21, 1995

[30] Foreign Application Priority Data

May 30, 1994 [JP] Japan .................................. 6-116912

[51] Int. Cl.⁶ .................................................. G06K 15/00
[52] U.S. Cl. ............................................ 395/102; 395/117
[58] Field of Search ................................... 395/117, 112, 395/105, 111, 115, 116, 144, 145, 102; 400/61, 62, 63, 64, 67, 70, 72, 76

[56]         References Cited

U.S. PATENT DOCUMENTS

5,444,828  8/1995  Kataoka ................... 395/117
5,450,541  9/1995  Rourke et al. ............ 395/117

Primary Examiner—Arthur G. Evans
Attorney, Agent, or Firm—Oliff & Berridge

[57]         ABSTRACT

In a document editing device, the print width of print data that are input from a keyboard or a floppy disk is detected, and a printable range of a print mechanism and the detected print width of the print data are displayed in association with each other on a display. The print width is freely shifted on a display screen by left and right cursors, and its shift position (print start position) is stored in a memory. A printing operation for the print data is performed on the basis of information of the stored shift position. Therefore, the actual print position can be recognized on the display before the printing operation is carried out.

20 Claims, 13 Drawing Sheets

| RESOLUTION ( DPI ) OF IMAGE DATA | ~60 |
|---|---|
| LATERAL WIDTH DOT NUMBER OF IMAGE DATA | ~61 |
| LONGITUDINAL WIDTH DOT NUMBER OF IMAGE DATA | ~62 |
| DOT MAP DATA CORRESPONDING TO PICTURE OF FIG.3 | ~63 |

| ITEM | INSTRUCTIONS |
|------|--------------|
| S11 | DISPLAY LIST OF IMAGE FILES SAVED IN FLOPPY, AND DISPLAY BLOCK CURSOR AT HEAD FILE |
| S12 | KEY INPUT PROCESSING |
| S13 | LOAD IMAGE DATA INTO STORAGE AREA 49 FOR PRINT-WIDTH IDENTIFIABLE DATA |
| S14 | RETURN INFORMATION REPRESENTING THAT IMAGE DATA ARE LOADED |
| S15 | RETURN CANCEL INFORMATION |
| S16 | SHIFT BLOCK CURSOR IN ACCORDANCE WITH CURSOR KEY |
| S18 | OTHER KEY PROCESSING |

| ITEM | INSTRUCTIONS |
|---|---|
| S21 | DISPLAYING PRINT POSITION INDICATING FRAME WITH IDENTIFICATION OF LATERAL WIDTH OF TARGET DATA (SEE FIG.6) |
| S22 | KEY INPUT PROCESSING |
| S23 | SET LEFT MARGIN OF DATA RANGE CURSOR 75 AS PRINT START POSITION AND SET IT INTO PRINT START POSITION STORING AREA 51, AND RETURN INFORMATION REPRESENTING THAT PRINT POSITION IS DETERMINED |
| S24 | RETURN CANCEL INFORMATION |
| S25 | IS DATA RANGE CURSOR 75 BEYOND PRINTABLE RANGE WHEN IT IS SHIFTED IN INPUTTED CURSOR DIRECTION ? |
| S26 | SHIFT DATA RANGE CURSOR 75 TO THE RIGHT OR LEFT IN ACCORDANCE WITH INPUTTED CURSOR DIRECTION |
| S27 | START BUZZER |

| ITEM | INSTRUCTIONS |
| --- | --- |
| S41 | PAPER INSERTION PROCESSING |
| S42 | SET VARIABLE INDICATING CURRENT PRINT LONGITUDINAL DOT IN PRINT WORK 52 TO "0" |
| S43 | CLEAR PRINT BUFFER |
| S44 | SET DATA PRINTABLE AT THE SAME TIME FROM STORAGE AREA FOR WIDTH-IDENTIFIABLE DATA AT POSITION OF PRINT BUFFER WHICH IS COMPENSATED FROM LEFT MARGIN OF PRINT BUFFER BY AMOUNT CORRESPONDING TO PRINT START POSITION |
| S45 | ADD SET DATA TO VARIABLE INDICATING CURRENT PRINT LONGITUDINAL DOT POSITION IN PRINT WORK 52 |
| S46 | PRINT DATA OF PRINT BUFFER AND FEED SHEET BY SET LONGITUDINAL DOT NUMBER |
| S47 | DOES VARIABLE INDICATING CURRENT LONGITUDINAL DOT POSITION EXCEED LONGITUDINAL DOT NUMBER OF DATA ? |
| S48 | PAPER DISCHARGE PROCESSING |

DOCUMENT EDITING DEVICE AND METHOD

BACKGROUND OF THE INVENTION

1. Field of the Invention

The present invention relates to a document editing device that is capable of printing, at a desired position, print data having a variable print width in a print line direction.

2. Description of Related Art

There have been hitherto known various kinds of document editing devices that are capable of printing print data having a variable print width in a print line direction, such as typewriters, wordprocessors, etc. Here, the print data having a variable print width in a print line direction are defined as print data having no fixed margin width. For example, ruled-line data in a ruled-line forming mode, image data that are formed by reading out an original image with a hand scanner as an image reading device, image data that are formed by a graphic editor, character array data, etc. constitute the print data having a variable print width as described above.

In order to print such print data having a variable print width in a print line direction using a print device such as a typewriter, a wordprocessor or the like, a print position must first be set. The print position setting operation is carried out as follows. An operator carries out a prescribed key operation to move a carriage having a print head serving as a print device in a print line direction and stop the carriage at a desired position. This operation corresponds to the setting of a print start position. That is, when a print operation is carried out while moving the carriage from the left to the right along a print line, the left margin of print data in the print width thereof is set to a desired position. Print devices of this type include not only devices such as a typewriter in which characters are typed on a sheet after the carriage is stopped, but also devices such as an ink jet printer in which character or graphic dot patterns are formed on a sheet while moving the carriage.

However, the conventional devices as described above have the following problems. In a typewriter, for example, the operator can move a print head to the print start position, however, the print end position on a print sheet cannot be specified because the data length of print data is unfixed. Therefore, there is a possibility that the print data cannot be printed at a desired position. That is, the operator cannot recognize the print width of the print data and the print position (print status) of the whole print data on the print sheet unless all the print data have been printed on the print sheet. Therefore, the print end position may be deviated from the print sheet after the print operation is completed, resulting in failure of the print operation. Accordingly, the print operation must be tentatively carried out several times.

SUMMARY OF THE INVENTION

An object of the present invention is to provide a document editing device that can easily print, at a desired position, even print data having a variable print width in a print line direction.

In order to attain the above object, the document editing device according to the present invention includes a data storage for storing print data having a variable print width in a print line direction, a print position setting device for setting a print position when the print data stored in the data storage are printed by a print device, a display for displaying the print data, a print width detector for detecting the print width in the print line direction of the print data stored in the data storage, print width storage for storing the print width that is detected by the print width detector, and a display controller for simultaneously displaying the print width stored in the print width storage and a printable range (print-permissible range) of the print device in association with each other, wherein the print position setting device includes a moving device for moving, on a display screen, the print width displayed on the display, and print position storage for storing the position of the print width moved by the moving device.

In the document editing device of the present invention thus constructed, the print data having the unfixed print width in the print line direction are stored in the data storage. The print width detector detects the print width in the print line direction of the print data stored in the data storage, and the print width storage stores the detected print width. The display controller controls the display to simultaneously display the print width stored in the print width storage and the printable range of the print device in association with each other. In this state, the print width displayed on the display is moved on the display screen using the moving device by an operator, and the position of the print width moved by the moving device is stored as the print position by the print position storage. The print data are printed from the stored print position by the print device.

As is apparent from the foregoing, according to the document editing device of the present invention, the print position of the print data can be easily indicated without actually printing the print data on a sheet. In addition, the document editing device of the present invention has a practical effect in that the print data can be prevented from being deviated from the print-permissible range.

Further, the print width of image data that are read by the image reading device is displayed in combination with the printable range on the display, so that the read image can be extremely easily printed at a desired position.

In addition, the print width can be easily positioned in consideration of the sheet width. That is, the position adjustment of the print width of the print data can be easily performed in consideration of the sheet width, which is arbitrarily set by the sheet width setting device, and thus, this invention can easily adapt to a change of the sheet width. Still further, the printable range is displayed in the format of a print scale so that the position adjustment of the print width of the print data can be easily performed.

BRIEF DESCRIPTION OF THE DRAWINGS

A preferred embodiment of the present invention will be described in detail with reference to the following figures wherein.

DETAILED DESCRIPTION OF PREFERRED EMBODIMENTS

A preferred embodiment according to the present invention will be described. This embodiment is described in conjunction with a wordprocessor to which the present invention is applied, but it is not meant to be limited thereto.

Figure 1:
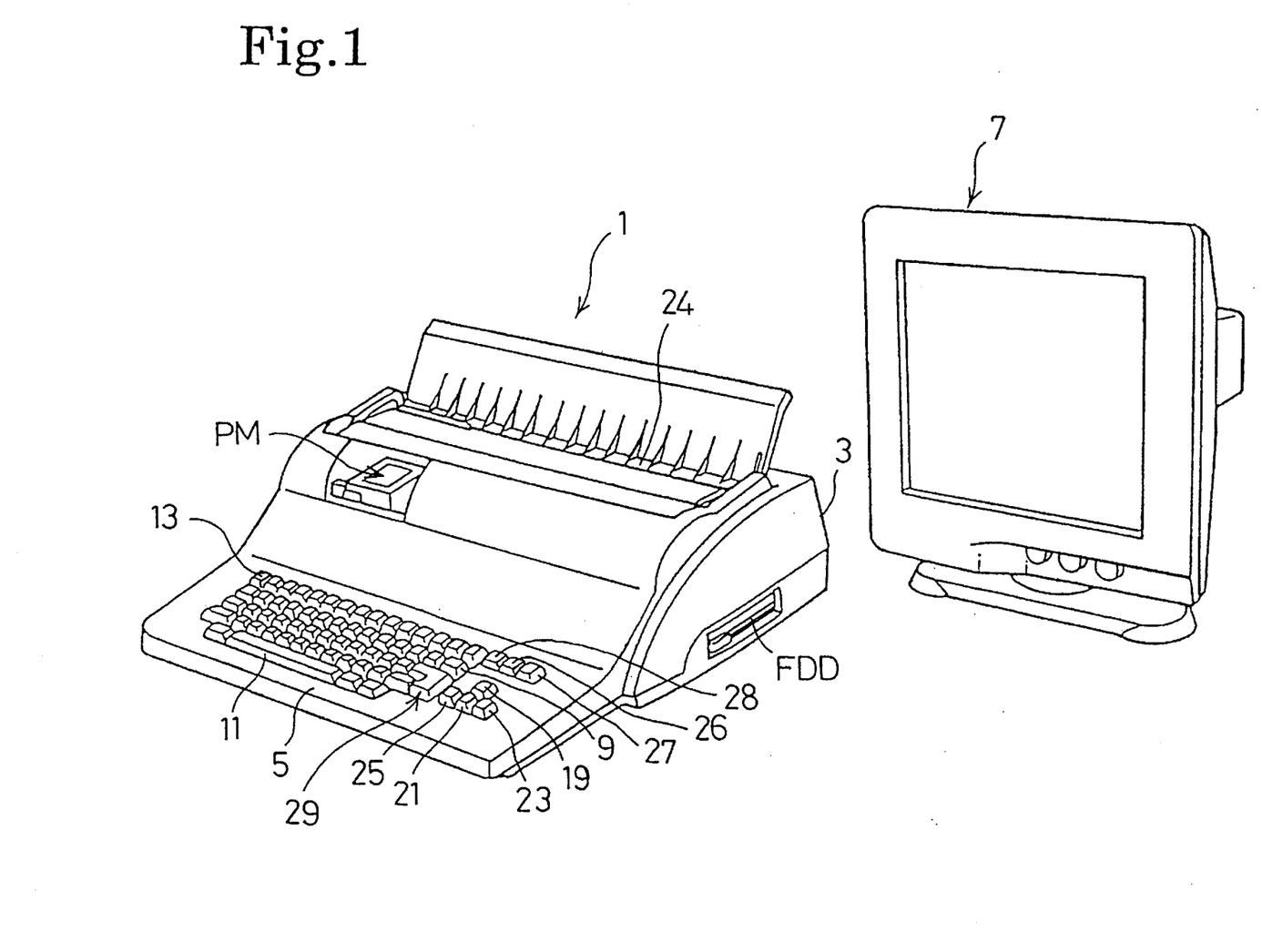
FIG. 1 is a perspective view showing a wordprocessor of an embodiment of the present invention.

As shown in FIG. 1, a keyboard 5 is disposed at the front side of a body frame 3 of a wordprocessor 1, and the keyboard 5 includes a character key 9, a space key 11, a print key 13 for performing a print operation, an up cursor key 19, a down cursor key 21, a cursor left key 25 for indicating a print start position, etc., a cursor right key 23, a return key 29 for determining various instructions, such as determining the print start position, etc., and a cancel key 28 for canceling functions. A sheet insertion port 24 is disposed at the top surface of the body frame 3 of the wordprocessor 1, and a sheet insertion key 27 for inserting a sheet and a sheet feeding key 26 for feeding the sheet upwardly and downwardly are provided on the keyboard 5. A print mechanism (print means) PM for printing characters, etc. on a sheet is disposed in front of the sheet insertion port 24.

A display device 7 for displaying characters, symbols, pictures, etc. that are input from the keyboard 5 is connected to the wordprocessor through a cable (not shown). On the side surface of the body frame 3 is provided a floppy disk driver FDD for operating a floppy disk on which document files or image files are recorded. The cursor left key 25, the cursor right key 23 and the return key 29 constitute the moving means of this invention.

Figure 2:
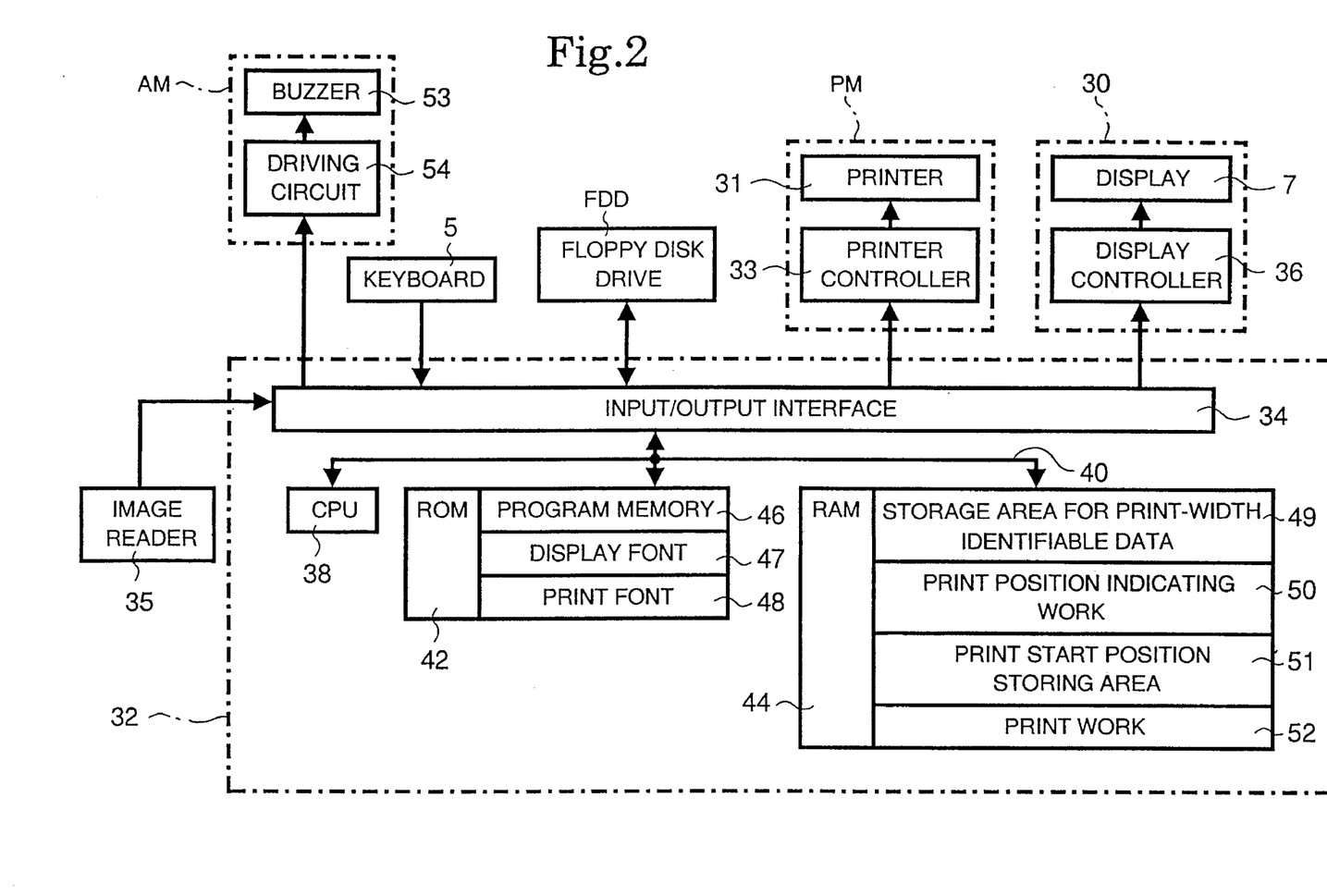
FIG. 2 is a block diagram showing the construction of a controller of the embodiment.

Next, the construction of a controller for the wordprocessor will be described with reference to a block diagram of FIG. 2.

The wordprocessor generally comprises the keyboard 5, a display mechanism 30, the print mechanism PM, the floppy disk drive FDD and a control device 32. The keyboard 5, the display mechanism 30, the print mechanism PM and the floppy disk drive FDD are connected to an input/output interface 34 of the control device 32.

The display mechanism 30 is of a general type and includes a display 7 and a display controller 36 containing a display RAM for outputting display data to the display 7. The print mechanism PM serves to drive the printer 31 through a printer controller 33. Specifically, it carries out various operations to perform a print operation, such as rotating a platen, shifting a print head to the right and left, jetting ink from the nozzles of the print head to attach the ink to a sheet, etc. The mechanism of the print head may use a daisy wheel printer when print-width identifiable data are character arrays.

A alarm (buzzer) mechanism AM comprises a driving circuit 54 and a buzzer 53, and the buzzer produces its sound when an invalidation key is pushed down.

The control device 32 comprises the input/output interface 34, which is connected to the CPU 38 through a bus 40 such as a data bus, a ROM 42 and a RAM 44. An image reader 35 serving as the image reading means is detachably attached to the input/output interface 34, and an original image is read out by the image reader 35. The read-out image data are stored as print data in a prescribed area in the RAM 44.

In a program memory 46 of the ROM 42 are stored various programs such as a program for controlling the display mechanism 30 in correspondence with codes input from the keyboard 5 to read in or form print-width identifiable data such as image data or the like and for storing the read-in or formed data as print data into a storage area 49 for print-width identifiable data (corresponding to the storage means of this invention) in the RAM 44; a program for indicating a print position of the print data, performing the print operation, etc., and other programs. When the print data as described above are character array data, a display FONT 47 used to display input character arrays and a print FONT 48 used to print the character arrays are stored. These print data have a variable print width in a print line direction.

The RAM 44 is provided with an area 49 for storing print-width identifiable data that are input from the keyboard 5 or a floppy disk through a floppy disk drive FDD, a WORK 50 (area for setting print start position) for indicating a print position, an area 51 for storing an indicated print start position, and various kinds of WORK 52 for performing the print operation.

Next, the indication of the print position for the print-width identifiable data, which is carried out by the control device 32 of the wordprocessor 1, will be described. General data such as image data may be used as the print-width identifiable data. The image data are read out by the image reader 35. In addition, other usable data include image data, which are formed by an image forming editor, character array data which are formed in a character input editing processing, etc.

Figure 3:
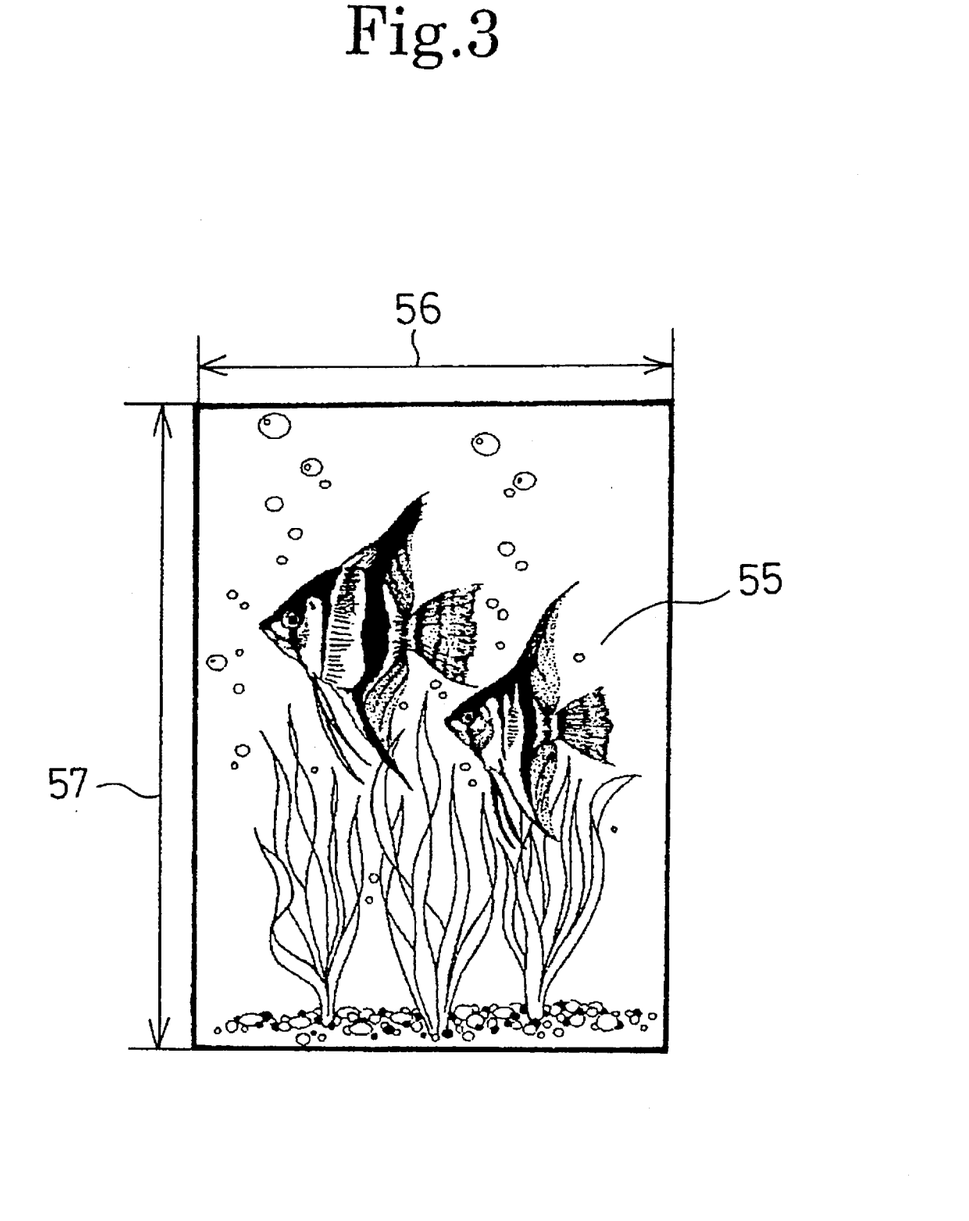
FIG. 3 is a diagram showing an example of image data that is print data of the embodiment.
Figure 4:
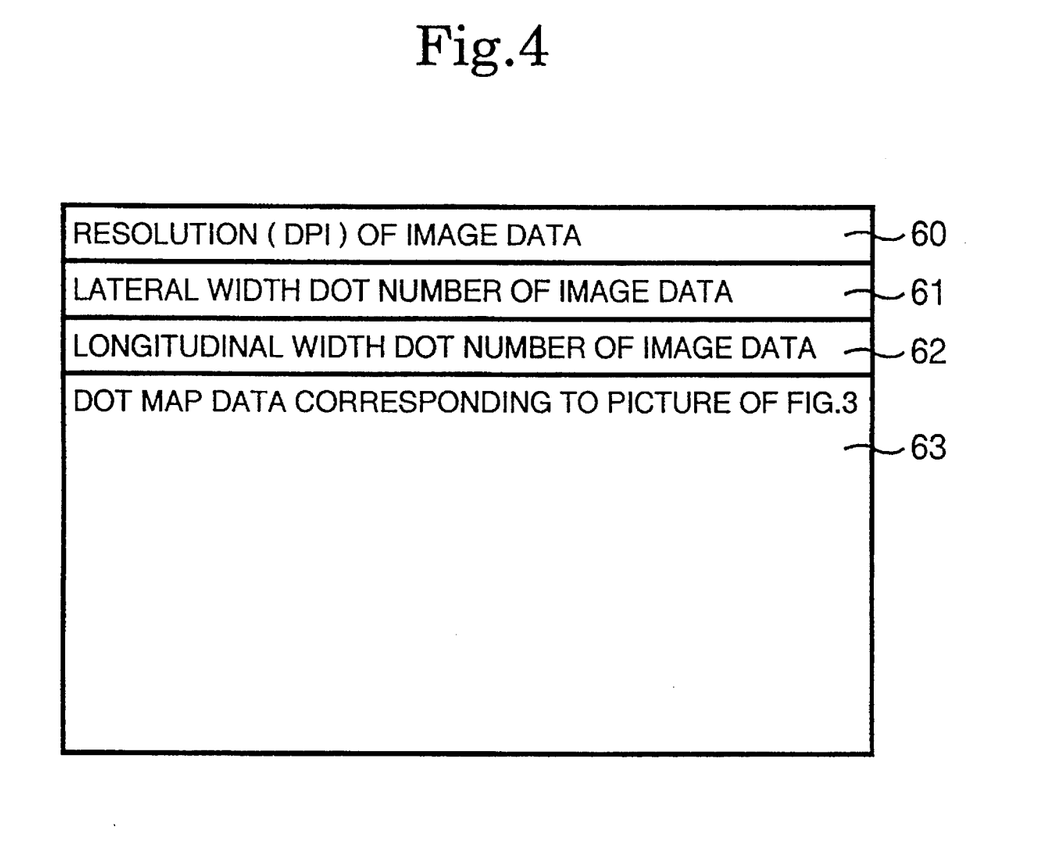
FIG. 4 schematically shows the construction of an image file of the embodiment.

In the following embodiment, image data 55 as shown in FIG. 3 are assumed to be formed by the image forming editor and stored on a floppy disk in a file structure as shown in FIG. 4, containing a resolution area 60 for the image data, an area 61 for storing the number of dots in a lateral direction of the image data, i.e., the number of dots of the lateral width of the image as indicated by reference numeral 56 in FIG. 3 (hereinafter referred to as "lateral-width dot number"), an area 62 for storing the number of dots in a longitudinal direction of the image data, i.e., the number of dots of the longitudinal width of the image as indicated by reference numeral 57 in FIG. 3 (hereinafter referred to as "longitudinal-width dot number"), a dot map data area 63 for storing image data that are represented in a dot map format (dot map data of the image as indicated by reference numeral 55 of FIG. 3), etc. The internal construction of the storage area 49 for the print-width identifiable data of FIG. 2 has the same structure as described above.

Figure 7:
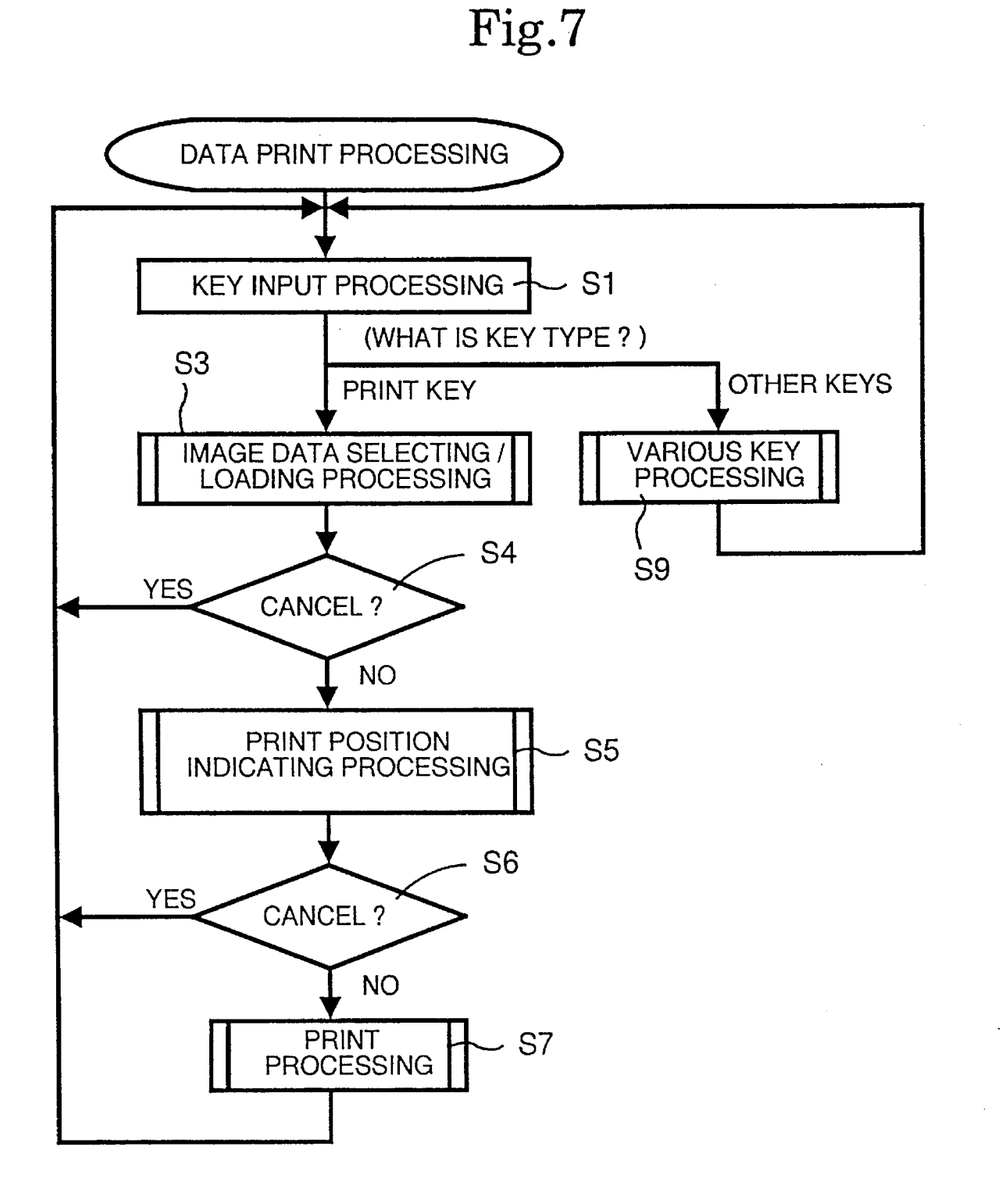
FIG. 7 is a flowchart showing a procedure of data print processing of the embodiment.

The operation of this embodiment will be described with reference to the flowchart of FIG. 7. When the print key 13 is pushed down as a key input (S1), the controller is shifted to an image data selecting/loading operation (S3). If cancel information is supplied in response to the above processing (S4:Y), the controller returns to the key input processing step (S1). On the other hand, if the supplied information is not the cancel information, the image data are loaded into the storing area 49 for the print-width identifiable data, and the controller is shifted to the print position indicating operation (S5). If cancel information is supplied in response to this operation (S5), the controller returns to the key input processing step (S1). If no cancel information is supplied, the controller goes to the image data print processing step (S7) to start the print operation of the selected image data from an indicated print position.

Figure 5:
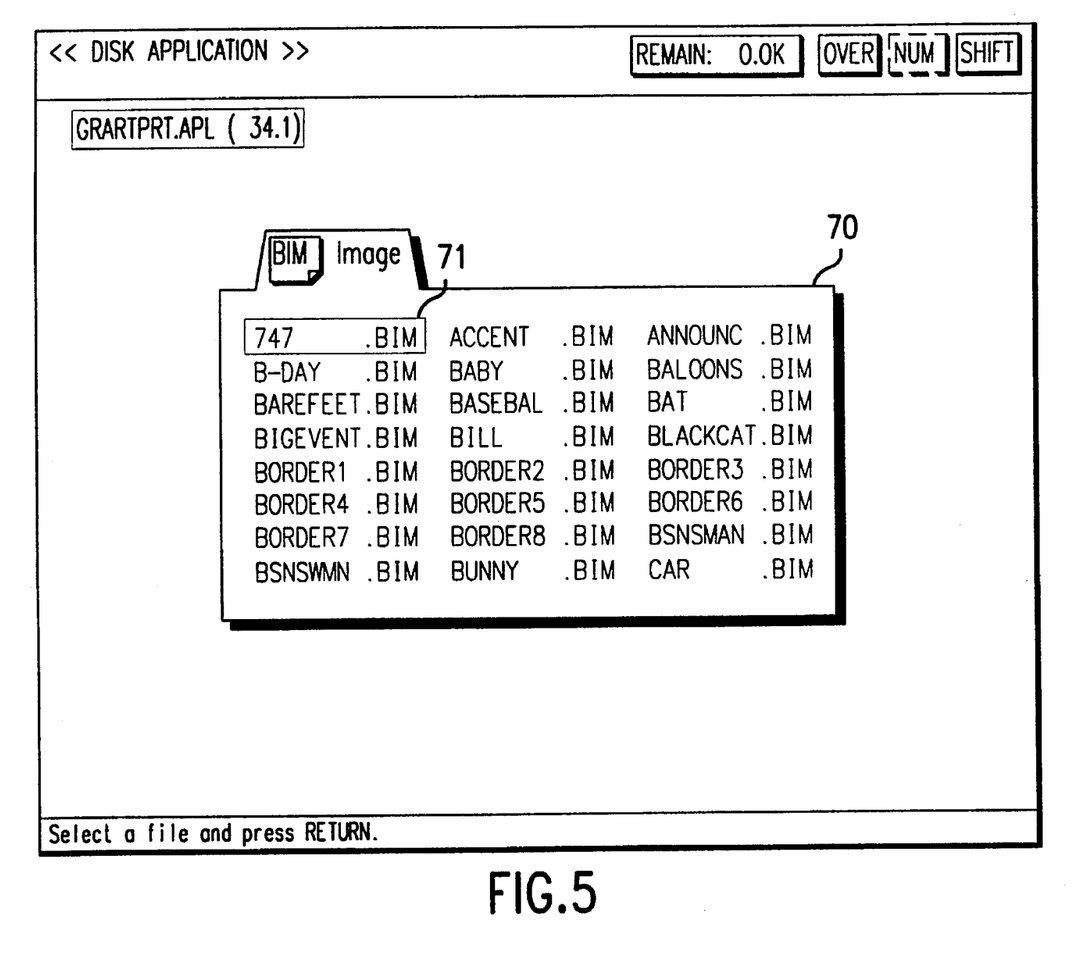
FIG. 5 is a diagram showing an image file selecting frame of the embodiment.
Figure 8A:
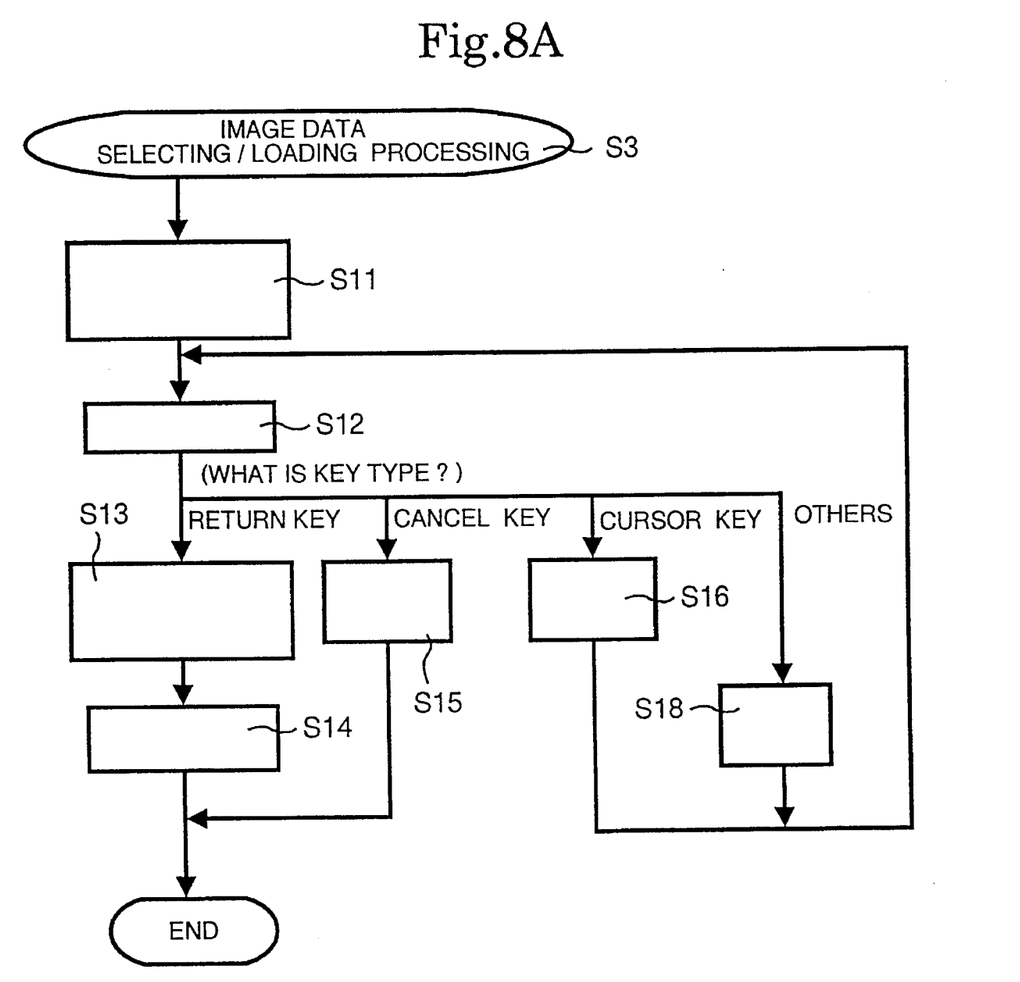
FIGS. 8A and 8B illustrate a procedure of an image data selecting/loading processing of the embodiment.
Figure 8B:
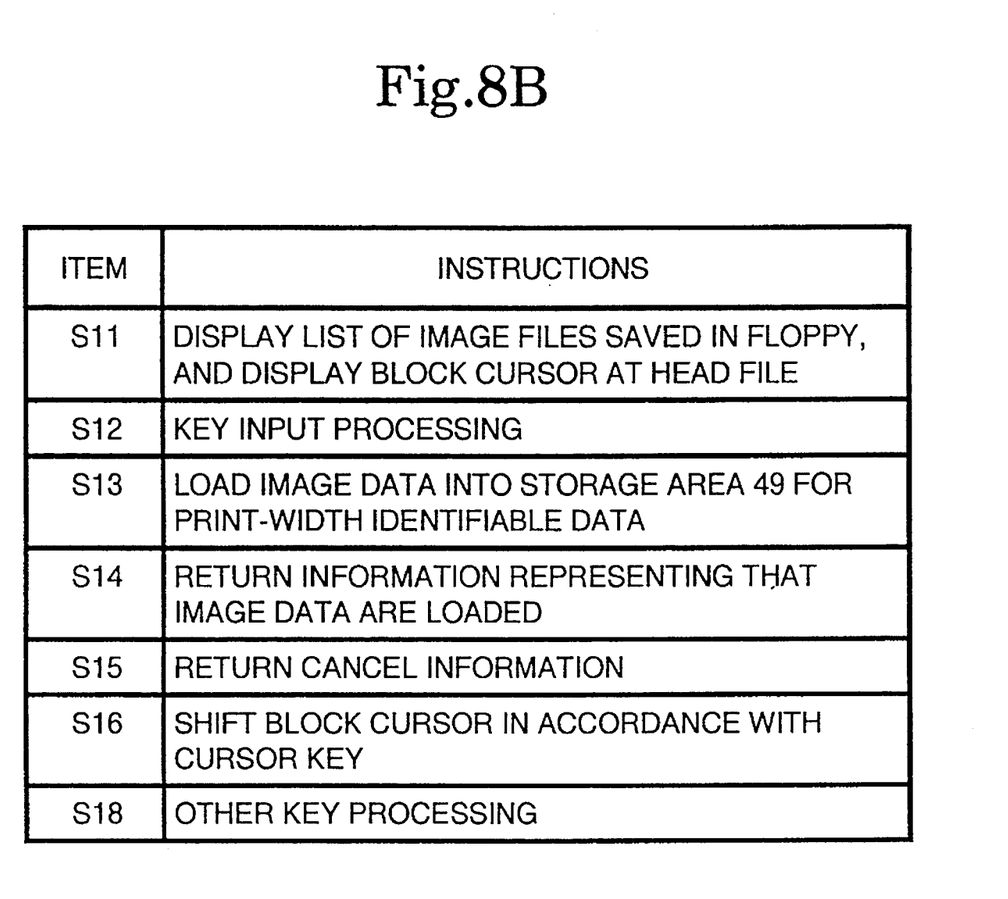

Next, the image data selecting/loading operation (S3) will be described with reference to FIGS. 5, 8A and 8B. First, an image file that is saved on the floppy disk is searched to display "INDEX FRAME" (as indicated by reference numeral 70 in FIG. 5). A block cursor 71 is displayed on the top file (S11). When the controller goes to the key input processing step (S12) and the up, down, left and right cursor keys (19, 21, 25, 23) are pushed down, the block cursor is shifted in accordance with the key direction (S16). When the cancel key 28 is pushed down in the key input processing step (S12), the cancel information is returned (S15). When the return key 29 is pushed down, the image data of a file at which the block cursor is located are loaded into the storage area 49 for the print-width identifiable data (S13), and information representing loading of the image data is returned (S14).

Figure 6:
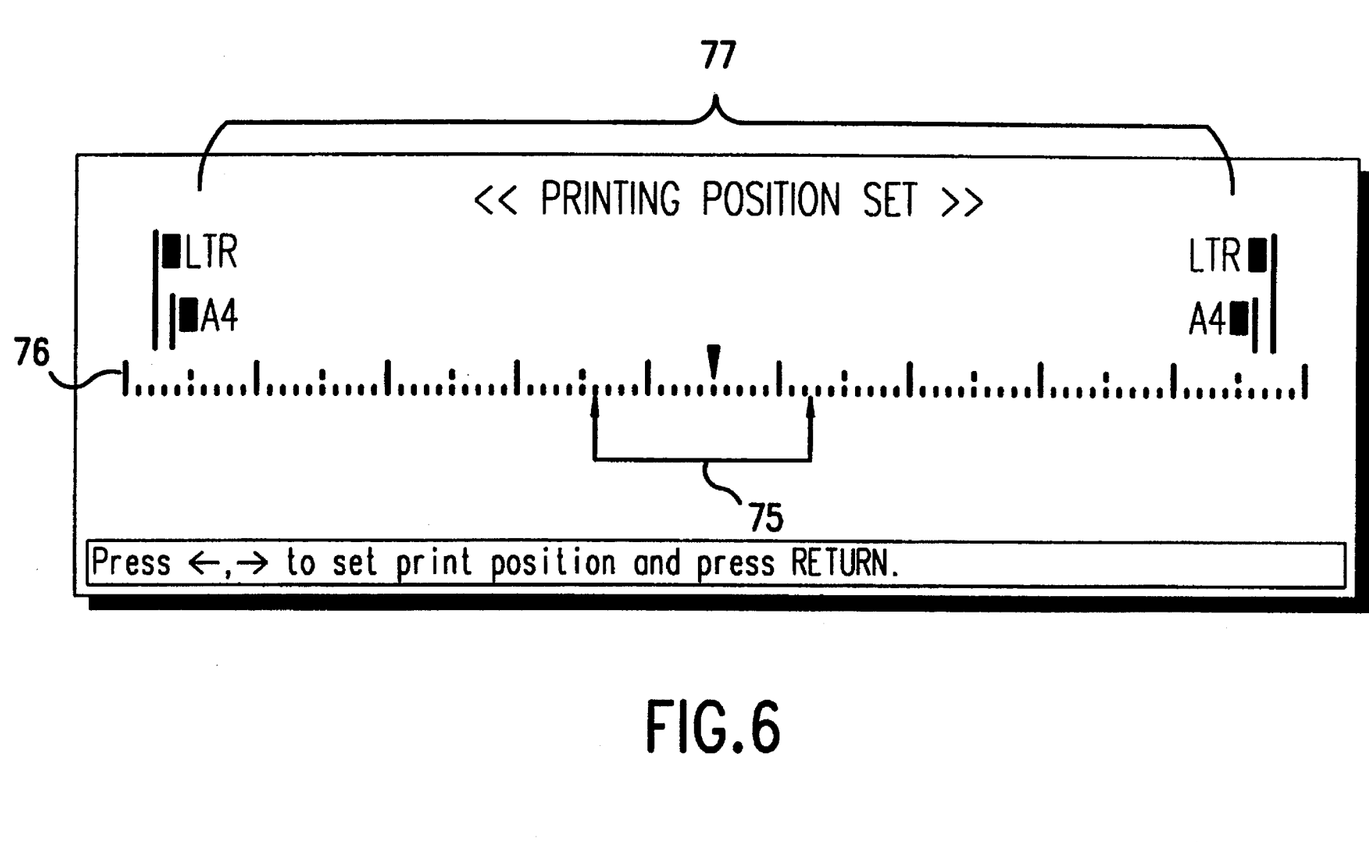
FIG. 6 is a diagram showing an image data print position indicating frame of the embodiment.
Figure 9A:
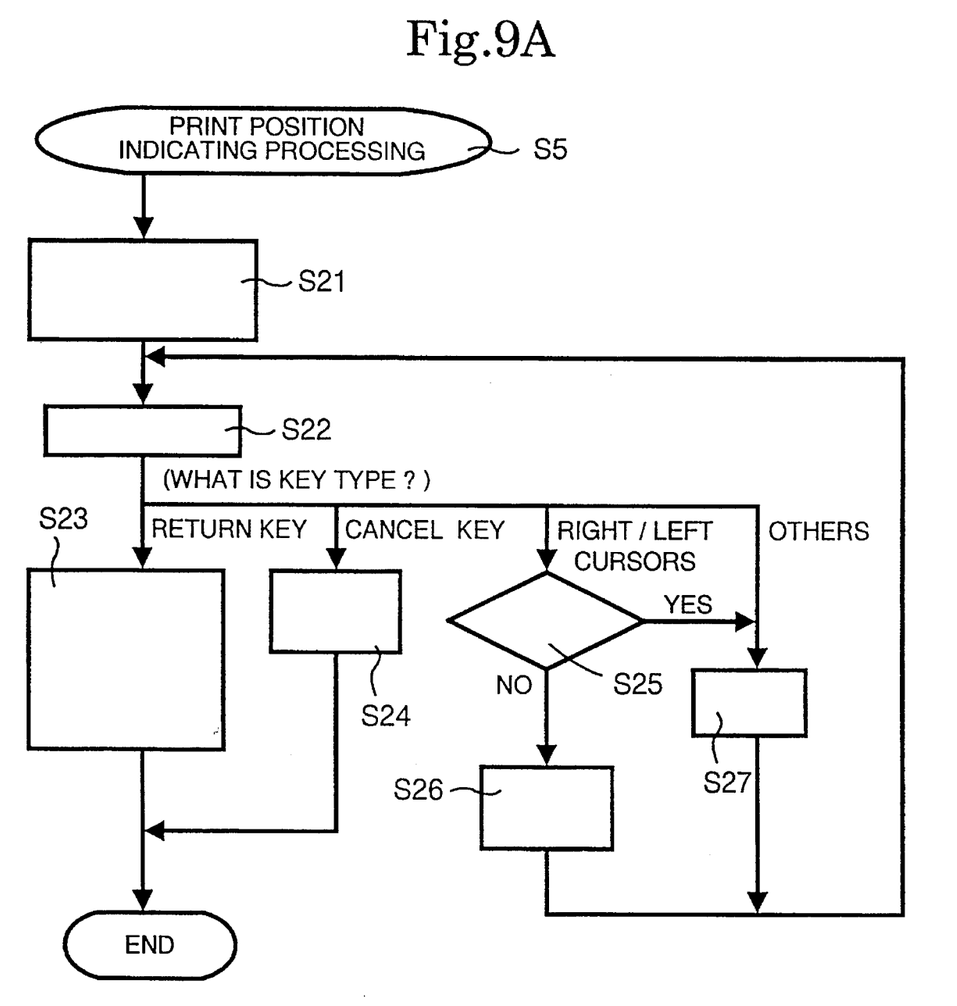
FIGS. 9A and 9B illustrate a procedure of a print position indicating processing of the embodiment.
Figure 9B:
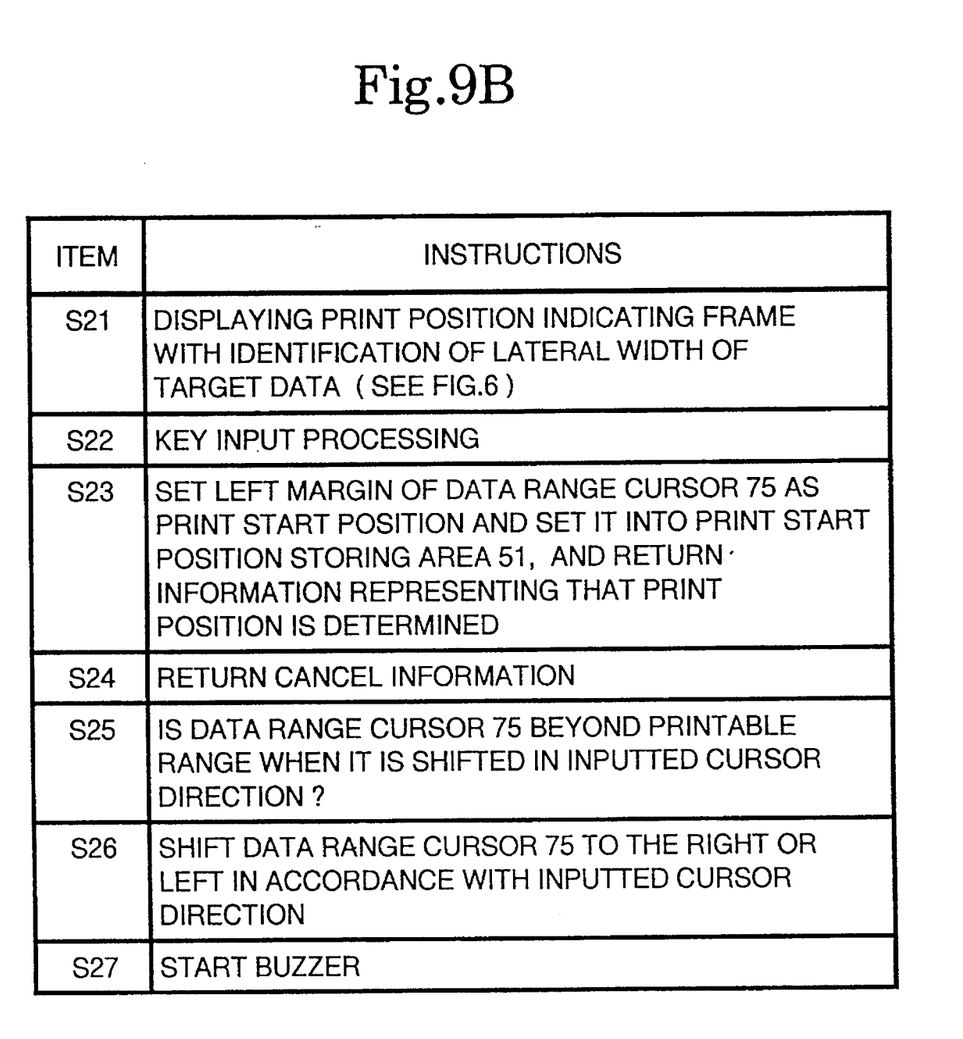

Next, the print position indicating processing (S5) will be described with reference to FIG. 6 and the flowchart of FIGS. 9A and 9B. First, a printable range is displayed on the display device 7 in such a scale display mode that the screen is graduated on a predetermined unit basis (as indicated by reference numeral 76 in FIG. 6). This printable range is based on the size of the print mechanism and other structural restrictions. In addition, the range (sheet width 77) when a sheet is located at a predetermined position and inserted is displayed on the display device 7 while its scale is matched to the scale as described above. In FIG. 6, the sheet width 77 of A4-size, and the sheet width 77 of Letter-size are displayed while positionally matched at the center position of the scale display 76. A range as indicated by "A4" corresponds to the sheet width 77 of the A4-size, and a range as indicated by "LTR" corresponds to the sheet width 77 of the Letter-size. At this time, plural sheet-width ranges may be simultaneously displayed on the display device 7 as described above, or only a selected sheet width may be displayed on the display device 7. In the latter case, a sheet width selecting switch serving as sheet width setting means is designed so that an operator can freely select any one of sheet-width ranges, and only the selected sheet width range is displayed in the scale display 76. For example, the selected sheet width range may be displayed while its center is positionally matched to the center position of the scale display 76, which indicates the printable range.

Further, on the basis of the lateral width dot number and resolution of the image data (print data), which are loaded into the storage area 49 for the print-width identifiable data, the size of the image data on the display is calculated for the scale 76 indicating the printable range, and the print width of the print data is displayed with a predetermined position being a reference position so that an operator can identify the print width of the print data (S21).

In this embodiment, the range indicating the whole print width of the print data as described above is referred to as "data range cursor 75," and the data range cursor 75 is initially displayed while positionally matched to the center of the scale display 76, indicating the printable range. Further, the position data of the left margin of the print width at this time is stored in a current position variable of the print position indicating WORK 50. This is because the control system of this embodiment is set so that the printing operation of the print data is carried out when the print head is moved from the left to the right along the print line direction.

If the left and right cursors (25,23) are pushed down in the key input processing step (S22), it is judged whether the data range cursor 75 on the display screen would be beyond the printable range if the data range cursor 75 is shifted by a predetermined unit (for example, a unit of three dots) in a direction corresponding to the direction of the pushed cursor (S25). If the data range cursor 75 is not beyond the printable range (S25:NO), the current position variable of the print position indicating WORK 50 is renewed by the shifted unit (three dots) (S26). If it is beyond the printable range (S25:YES), the buzzer 53 serving as the alarm means is started (S27). In place of the buzzer, an alarm message may be displayed on the display frame as the alarm means. If the cancel key 28 is pushed in the key input processing step (S22), the cancel information is returned, so that the controller goes out of the print position indicating processing step (S24). If the return key 29 is pushed in the key input processing step (S22), the current position variable of the print position indicating WORK 50 is identified as the print start position, the value of the variable is set into the print start position storing area 51, and information representing that the print start position is determined is returned (S23).

Figure 10A:
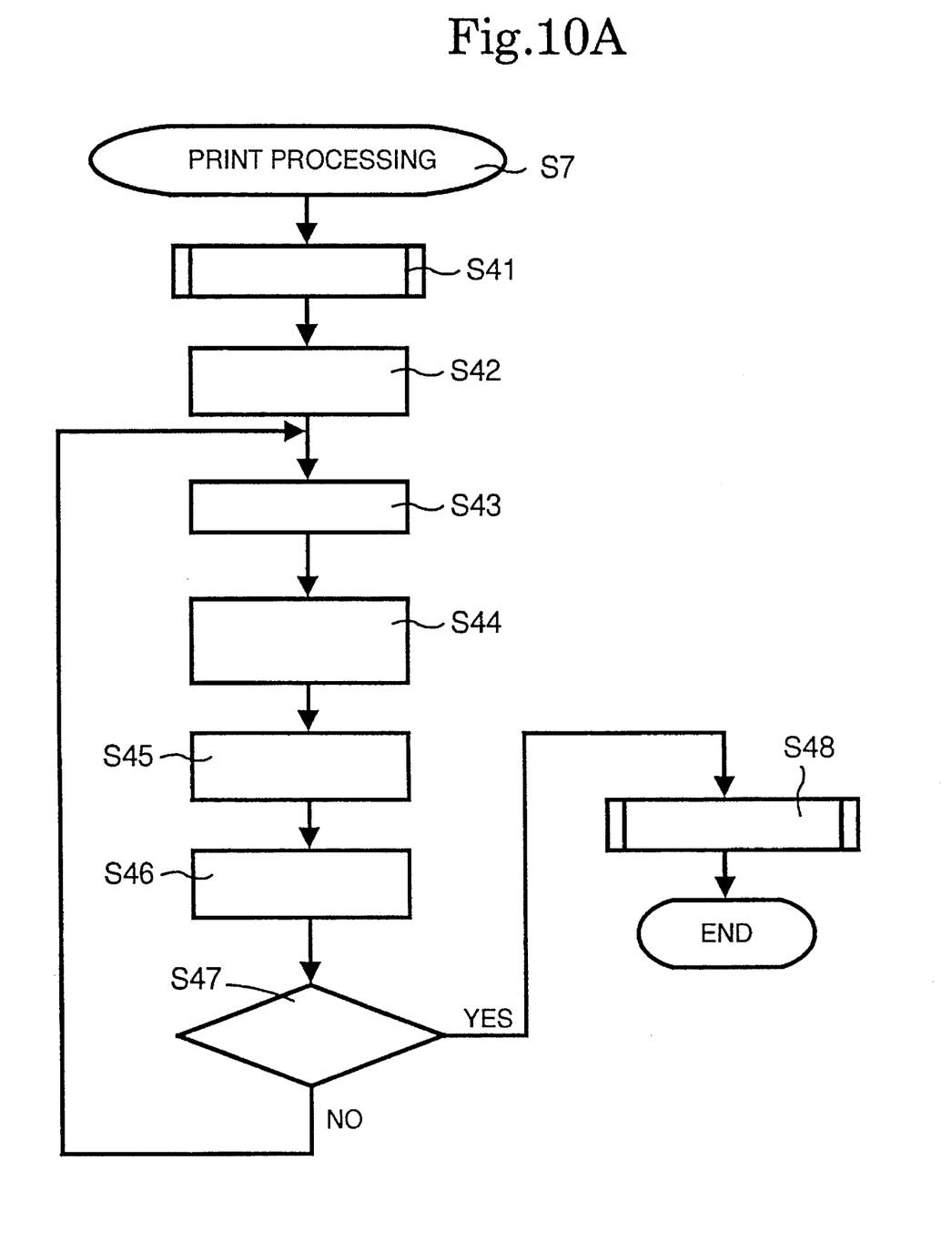
FIGS. 10A and 10B illustrate a procedure of a print processing of the embodiment.
Figure 10B:
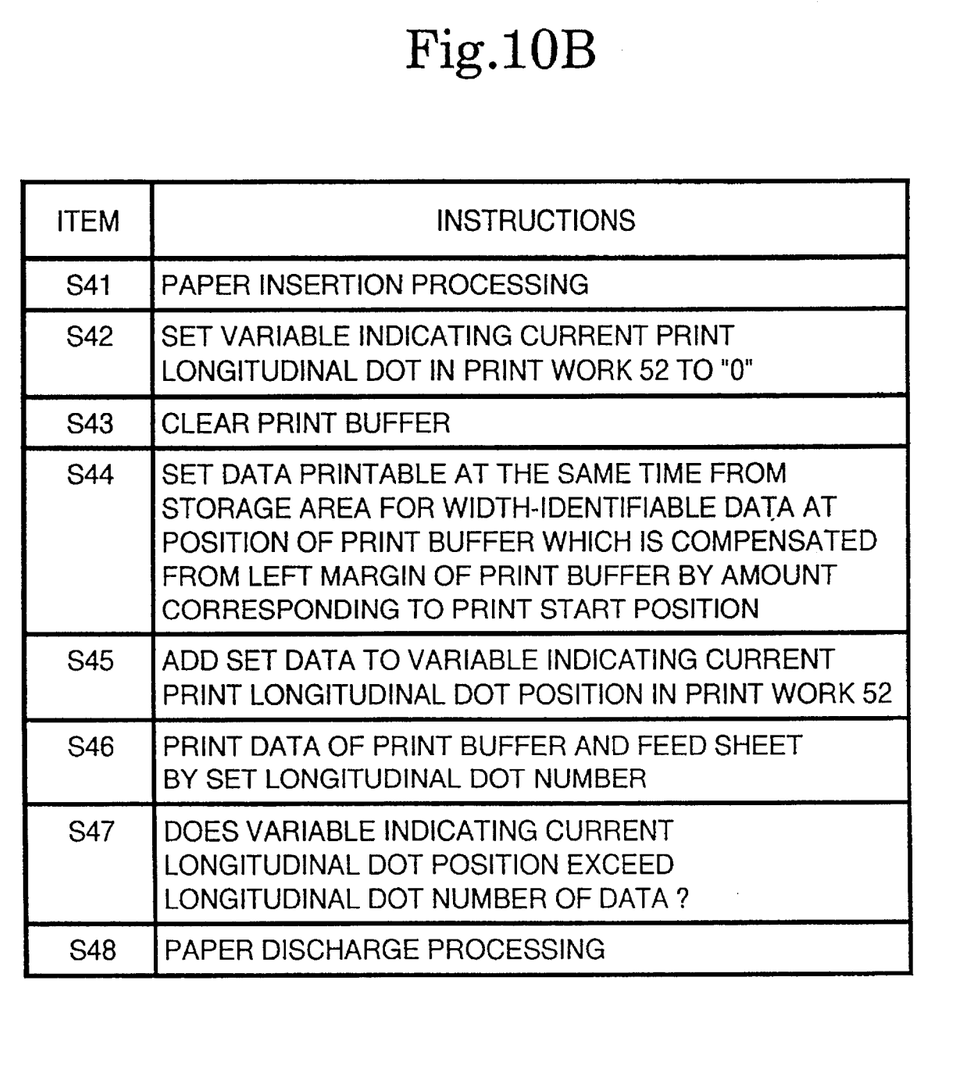

Next, the print processing will be described with reference to the flowchart of FIG. 10A. For the printing operation, a processing for prompting the operator to insert a sheet is executed (S41). Next, a variable indicating a current print-width longitudinal dot in the print WORK 52 is set to "0" (S42). Further, the print buffer in the print WORK 52 is cleared (S43). The print buffer can store data of lateral-width dot number in the printable range for the nozzles of the print head of the print mechanism PM. Subsequently, data that are printable at the same time are transmitted from the dot map data 63 of the storage area 49 for the print-width identifiable data, and set at a position in the print buffer, which is compensated (shifted) from the left margin of the print buffer by the amount corresponding to the data in the print start position storing area 51 (S44).

Next, the longitudinal dot number, which is set in the print buffer, is added to the variable indicating the current print longitudinal dot position in the print WORK 52 (S45). The data in the print buffer are printed, and the sheet is fed by an amount corresponding to the summed longitudinal dot number (S46). It is judged whether a variable indicating the current longitudinal dot position exceeds the longitudinal dot number of the print data, and on the basis of this judgment, it is judged whether the printing operation of the print data is completed (S47). If the variable indicating the current longitudinal dot position is above the longitudinal dot number of the print data (S47: Y), a paper discharge processing is carried out (S48). If the variable indicating the current longitudinal dot position is less than the longitudinal dot number of the print data, the controller returns to step S43 to perform the printing operation for an unprinted portion.

As described above, the printable range (scale display) 76 and the data range cursor 75 indicating the print width are displayed in association with each other, and the data range cursor 75 indicating the print width is shifted in the right and left directions relative to the printable range 76 by the right and left cursor keys to alter the print position, thereby indicating the print start position of the print-width identifiable print data. Therefore, the print data can be easily printed at an arbitrarily desired position. Further, the sheet width display 77 for the width of various types of sheets such as A4, Letter, etc. is performed in association with the printable range 76 when the print position is indicated, thereby further facilitating the print position indication.

This invention is not limited to the above embodiment, and various modifications may be made without departing from the subject matter of this invention. For example, the image data are used in the above embodiment. However, this invention is also applicable to character array data. In this case, the print width of the character array is identifiable on the basis of character pitch data in the print font 48 of the ROM 42, and thus, it can serve as target data for print position indication as described above. That is, the print width detecting means contains not only means of detecting the number of dots in the print line direction of the image data, but also means of reading out the number of dots in the lateral width direction of each character from the print font when a character array is printed, thereby detecting the lateral width (print width) of the whole character array. When the target data are character array data, the print mechanism PM may be a mechanism for performing a print operation using a daisy wheel.

What is claimed is:

1. A document editing device, comprising:
   data storing means for storing print data having a variable print width in a print line direction, the print data comprising at least a number of dots in a lateral direction and a resolution of the print data;
   main display means for providing a display;
   print means for printing the print data on a print medium;
   print width detecting means for detecting the print width in the print line direction of the print data stored in said data storing means, said print width of the print data is calculated based on at least the number of dots and the resolution of the print data; and
   print width display means for displaying the print width detected by said print width detecting means on said main display means.

2. The document editing device as claimed in claim 1, further comprising print medium width display means for displaying the print medium width in the print line direction of the print medium on said main display means, wherein said print width display means displays the print width in association with the print medium width displayed by said print medium width display means.

3. The document editing device as claimed in claim 2, wherein the print width is a print width range of the print data, and wherein the print medium width is a print medium width range, said print width display means and said print medium width display means displaying the print width range and the print medium width range, respectively.

4. The document editing device as claimed in claim 3, further comprising moving means for moving the print width range displayed by said print width display means relative to the print medium width range displayed by said print medium width display means.

5. The document editing device as claimed in claim 4, further comprising print position storing means for storing the print position of the print data on the basis of the position of the print width range, which is moved relative to the print medium width range by said moving means.

6. The document editing device as claimed in claim 5, wherein said print position storing means stores the print start position of the print data.

7. The document editing device as claimed in claim 4, wherein said print width display means indicates the print width range with a cursor, said cursor indicating top and end edges of the print width range.

8. The document editing device as claimed in claim 4, further comprising alarm means for providing an alarm when the print width range is moved beyond the print medium width range by said moving means.

9. The document editing device as claimed in claim 8, wherein said alarm means comprises one of a buzzer and an alarm message.

10. The document editing device as claimed in claim 4, further comprising sheet width setting means for setting the print medium width.

11. The document editing device as claimed in claim 1, further comprising printable range display means for displaying a printable range in the print line direction of said print means on said main display means, wherein the print width is a print width range of the print data, and wherein said print width display means displays the print width range in association with the printable range displayed by said printable range display means.

12. The document editing device as claimed in claim 11, further comprising print medium width display means for displaying a print medium width range in the print line direction of the print medium on said main display means, wherein the print width range, the print medium width range and the printable range are displayed in association with each other on said main display means.

13. The document editing device as claimed in claim 11, wherein said printable range display means displays the printable range in a print scale.

14. The document editing device as claimed in claim 1, wherein the print data is image data.

15. A document editing device, comprising:
    a data storage device that stores print data having a variable print width in a print line direction, the print data comprising at least a number of dots in a lateral direction and a resolution of the print data;
    a display device;
    a print width detector communicating with said data storage device, said print width detector detecting the print width in the print line direction of the print data stored in said data storage device, said print width of the print data being calculated based on at least the number of dots and the resolution of the print data; and
    a print width display communicating with said print width detector, wherein said print width is a print width range, said print width display displaying the print width range on said display device.

16. The document editing device as claimed in claim 15, further comprising a print medium width display displaying a print medium width range in the print line direction of the print medium on said display device, wherein said print width display displays the print width range in association with the print medium width range displayed by said print medium width display.

17. The document editing device as claimed in claim 16, further comprising a moving device cooperating with said display device, said moving device moving the print width range displayed by said print width display relative to the print medium width range displayed by said print medium width display.

18. The document editing device as claimed in claim 17, further comprising an alarm communicating with said moving device, said alarm providing an indication when the print width range is moved beyond the print medium width range by said moving device.

19. The document editing device as claimed in claim 16, further comprising a printable range display displaying a printable range in the print line direction of said printing device on said display device, wherein the print width range, the print medium width range and the printable range are displayed in association with each other on said display device.

20. A method of document editing, comprising:

storing print data having a variable print width in a print line direction, at least a number of dots in a lateral direction and a resolution of the print data;

detecting the print width in the print line direction of the print data stored in said storing step by calculating based on at least the number of dots and the resolution of the print data, the print width being a print width range;

displaying a print medium width range in the print line direction of the print medium on a display;

displaying the print width range in association with the print medium width range displayed in said print medium width range display step; and enabling moving of the print width range displayed in said print width range display step relative to the print medium width range displayed in said print medium width range display step.

* * * * *